United States Patent
Dixit

(10) Patent No.: US 10,089,504 B2
(45) Date of Patent: Oct. 2, 2018

(54) NEAR FIELD COMMUNICATION DEVICE

(71) Applicant: NXP B.V., Eindhoven (NL)

(72) Inventor: Harish D. Dixit, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/281,052

(22) Filed: Sep. 29, 2016

(65) Prior Publication Data
US 2017/0091497 A1 Mar. 30, 2017

(30) Foreign Application Priority Data

Sep. 29, 2015 (EP) .................................. 15187377

(51) Int. Cl.
*G06K 7/08* (2006.01)
*G06K 7/10* (2006.01)
(Continued)

(52) U.S. Cl.
CPC ......... *G06K 7/10297* (2013.01); *G06F 21/44* (2013.01); *G06K 7/10257* (2013.01);
(Continued)

(58) Field of Classification Search
CPC ........... G06K 7/10297; G06K 7/10259; G06K 19/07; G06K 19/0723; G06F 21/44; H04B 5/0062
(Continued)

(56) References Cited

U.S. PATENT DOCUMENTS

| 8,478,195 B1 | 7/2013 | Hewinson |
| 2014/0139323 A1 | 5/2014 | Choo et al. |

(Continued)

FOREIGN PATENT DOCUMENTS

| EP | 1 744 267 A2 | 1/2007 |
| WO | WO 2007/072264 A2 | 6/2007 |

OTHER PUBLICATIONS

"Introduction to NFC—Version 1.0" Nokia, 30 pgs, retrieved from the internet at: URL: http://www.adafruit.com/datasheets/Introduction_to_NFC_v1_0_en.pdf (Apr. 19, 2011).
(Continued)

*Primary Examiner* — Karl D Frech

(57) ABSTRACT

According to a first aspect of the present disclosure, a near field communication device is provided which comprises a storage unit, wherein said storage unit is configured and adapted to store sequence-specific data relating to at least one sequence of devices of which said near field communication device forms part. According to a second aspect of the present disclosure, a corresponding method for configuring a near field communication device is conceived. According to a third aspect of the present disclosure, a near field communication reader is provided which comprises: a near field communication unit which is configured and adapted to read at least one sequence of devices; and a processing unit which is configured and adapted to execute a function associated with said sequence only if all devices of said sequence have been read. According to a fourth aspect of the present disclosure, a corresponding method for facilitating the execution of functions is conceived. According to a fifth aspect of the present disclosure, a non-transitory computer program product corresponding to said methods is provided.

17 Claims, 3 Drawing Sheets

200

Sequence-specific data

| Sequence ID Attribute | Sequence Order Attribute | Timing Attribute | Function Attribute |
|---|---|---|---|
| SeqID_1 | 2 | 24 hours | << Discount code fragment >> |
| SeqID_2 | 4 | 1-Jan-2016 | << Authentication key fragment >> |

(51) Int. Cl.
  *G06K 19/07* (2006.01)
  *G06F 21/44* (2013.01)
  *H04B 5/00* (2006.01)
(52) U.S. Cl.
  CPC ......... *G06K 19/07* (2013.01); *G06K 19/0723* (2013.01); *H04B 5/0056* (2013.01)
(58) Field of Classification Search
  USPC ..... 235/451, 487, 492, 380, 379, 382, 382.5
  See application file for complete search history.

(56) References Cited

U.S. PATENT DOCUMENTS

| | | | |
|---|---|---|---|
| 2015/0339399 A1* | 11/2015 | Doss | H04W 12/04 |
| | | | 235/375 |
| 2016/0134831 A1 | 5/2016 | Dixit | |
| 2016/0373906 A1* | 12/2016 | Khan | H04W 4/001 |

OTHER PUBLICATIONS

Extended European Search Report for Patent Appln. No. 15187377.5 (dated Mar. 11, 2016).

* cited by examiner

NEAR FIELD COMMUNICATION DEVICE

CROSS-REFERENCE TO RELATED APPLICATIONS

This application claims the priority under 35 U.S.C. §119 of European patent application no. 15187377.5, filed on Sep. 29, 2015, the contents of which are incorporated by reference herein.

FIELD

The present disclosure relates to a near field communication device and to a corresponding method for configuring a near field communication device. Furthermore, the present disclosure relates to a near field communication reader and to a corresponding method for facilitating the execution of functions. Furthermore, the present disclosure relates to a non-transitory computer program product corresponding to said methods.

BACKGROUND

Today, the use of so-called near field communication (NFC) enables the wireless transmission of data over relatively short distances. NFC technology enables simple and safe two-way interactions between electronic devices, allowing consumers to perform contactless transactions, access digital content, and connect electronic devices with a single touch. NFC complements many popular consumer-level wireless technologies by utilizing the key elements in existing standards for contactless smart card technology (for example, ISO/IEC 14443 A and B and JIS-X 6319-4). NFC is compatible with existing contactless smart card infrastructures and thus it enables a consumer to utilize one device across different systems. There are various types of NFC devices, for example simple NFC tags or stickers and NFC readers. An NFC tag is usually a passive device, i.e. it does not have its own power source but instead it is powered by a field generated by another NFC device, such as an NFC reader. More complex NFC devices may operate in different modes, specifically: a reader/writer mode, which allows an NFC device to read and/or write passive NFC tags and stickers; a peer-to-peer mode, which allows the NFC device to exchange data with other NFC peer devices; a Host Card Emulation (HCE) mode, which allows the NFC device to act as an NFC card. An emulated NFC card can be accessed by an external NFC reader, such as an NFC point-of-sale terminal. Host Card Emulation (HCE) is the presentation of a virtual and exact representation of a smart card using only software. NFC devices, such as NFC tags/stickers, emulated NFC cards and also NFC-compatible smart cards, often support only a limited number of functions. Typically, an NFC reader reads a limited amount of data from such NFC devices, and subsequently performs a simple function such as a fare transaction or a discount operation. Although NFC provides a convenient way to support such functions, it may be desirable to increase the range and/or the amount of supported functions.

SUMMARY

According to a first aspect of the present disclosure, a near field communication device is provided which comprises a storage unit, wherein said storage unit is configured and adapted to store sequence-specific data relating to at least one sequence of devices of which said near field communication device forms part.

In one or more embodiments, the sequence-specific data comprise a sequence identifier attribute which identifies the sequence of devices.

In one or more embodiments, the sequence of devices is an ordered sequence, and the sequence-specific data comprise a sequence order attribute which specifies a position of the near field communication device in said ordered sequence.

In one or more embodiments, the sequence-specific data comprise a function attribute which enables, at least in part, an external near field communication reader to execute a function associated with the sequence of devices.

In one or more embodiments, the function attribute comprises authentication data which enable said near field communication reader to perform an authentication algorithm that takes said authentication data as an input.

In one or more embodiments, the authentication data comprise at least a part of a cryptographic key.

In one or more embodiments, the sequence-specific data comprise a timing attribute which specifies a timing requirement associated with said function.

In one or more embodiments, the near field communication device is a near field communication tag.

According to a second aspect of the present disclosure, a method for configuring a near field communication device is conceived, the method comprising storing, in a storage unit of said near field communication device, sequence-specific data relating to at least one sequence of devices of which said near field communication device forms part.

According to a third aspect of the present disclosure, a near field communication reader is provided which comprises: a near field communication unit which is configured and adapted to read at least one sequence of devices; and a processing unit which is configured and adapted to execute a function associated with said sequence only if all devices of said sequence have been read.

In one or more embodiments, the processing unit is configured and adapted to execute said function only if the devices of said sequence have been read in a predefined order.

In one or more embodiments, the processing unit is configured and adapted to execute said function only if the time elapsed between reading particular ones of said devices does not exceed a predefined threshold and/or only if at least one of said devices has been read before a predefined expiry time.

In one or more embodiments, the function is an authentication algorithm that takes authentication data retrieved from said devices as input, and the processing unit is further configured and adapted to enable user access to the near field communication reader in dependence on an output of said authentication algorithm.

According to a fourth aspect of the present disclosure, a method for facilitating the execution of functions is conceived, the method comprising: reading, by a near field communication unit comprised in a near field communication reader, at least one sequence of devices; and executing, by a processing unit comprised in said near field communication reader, a function associated with said sequence only if all devices of said sequence have been read.

According to a fifth aspect of the present disclosure, a non-transitory computer program product is provided comprising instructions which, when being executing by a processing unit, cause said processing unit to carry out a method according to the second aspect or a method according to the fourth aspect.

DESCRIPTION OF DRAWINGS

Embodiments will be described in more detail with reference to the appended drawings, in which.

DESCRIPTION OF EMBODIMENTS

Figure 1:
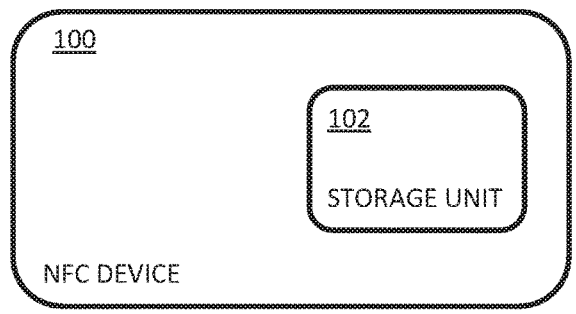
FIG. 1 shows an illustrative embodiment of an NFC device.

FIG. 1 shows an illustrative embodiment of an NFC device 100. The NFC device 100 comprises a storage unit 102. The storage unit 102 is configured and adapted to store sequence-specific data relating to at least one sequence of devices of which said near field communication device forms part. Thus, if an NFC reader reads these sequence-specific data from said NFC device, and combines said sequence-specific data with sequence-specific data retrieved from other NFC devices of the same sequence, the NFC reader may perform sequence-specific functions. In other words, the NFC reader may, in addition to the functions already supported by stand-alone or individual NFC devices, now also execute sequence-specific functions, and thus the range and/or the amount of executable functions may effectively be increased.

Figure 2:
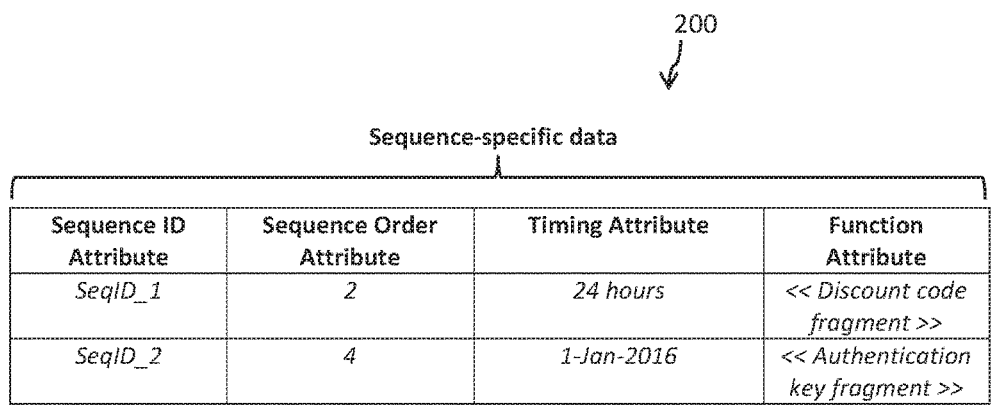
FIG. 2 shows an illustrative embodiment of the content of a storage unit.

FIG. 2 shows an illustrative embodiment of the content of a storage unit as shown in FIG. 1. As mentioned above, in one or more embodiments, the sequence-specific data comprise a sequence identifier attribute which identifies the sequence of devices. In this way, it is easier for an external NFC reader to determine to which sequence the NFC device belongs. By consequence, the use of multiple sequences is also facilitated: the NFC device may form part of more than one sequence, and in that case the storage unit may store a plurality of sequence identifier attribute values. This is shown in the example of FIG. 2: the NFC device forms part of two sequences, identified by the attribute values "SeqID_1" and "SeqID_2".

Furthermore, the storage unit may contain a sequence order attribute. This attribute defines, for a given sequence of which the NFC device forms part, its position in said sequence. It is noted that this attribute is relevant only for ordered sequences, and may be dispensed with, remain unused or have an arbitrary value for unordered sequences. The use of the sequence order attribute allows for supporting or implementing functions for which an NFC reader needs to receive data in a certain predefined order, as will be described in more detail with reference to some examples hereinbelow. In the shown example, the sequence order attribute has value "2" for "SeqID_1", which indicates that the NFC device occupies the second position in the ordered sequence identified by "SeqID_1". Likewise, the sequence order attribute has value "4" for "SeqID_2", which indicates that the NFC device occupies the fourth position in the ordered sequence identified by "SeqID_2".

Furthermore, the storage unit may contain a function attribute. The function attribute may enable, at least in part, the external NFC reader to execute a specific function associated with a given sequence of devices. Thus, in addition to functional instructions and/or functional data that are fully contained in the NFC reader and that may be used by said NFC reader simply after having tapped all NFC devices of a given sequence, the NFC reader may also collect functional instructions and/or functional data from the NFC devices and use them to execute a corresponding function. In that case, since the functional instructions and/or functional data should be obtained from a plurality of sources and the function cannot be executed until all of them are collected, a higher security level may be achieved. In the shown example, the function attribute contains a fragment of a discount code for the ordered sequence identified by "SeqID_1". This may mean that an NFC reader should first collect a first fragment of the discount code from another (first) NFC device (i.e., from an NFC device having sequence order attribute value "1" for "SeqID_1") and then collect the second fragment of the discount code from the current (second) NFC device. Possibly, the NFC reader should then obtain further discount code fragments from other NFC devices. Finally, the NFC reader may assemble all code fragments into a discount code and perform a discount operation.

In one or more embodiments, the function attribute comprises authentication data which enable the NFC reader to perform an authentication algorithm that takes said authentication data as an input. The authentication algorithm may be based on a cryptographic algorithm, such as AES and 3-DES. Alternatively or in addition, the authentication algorithm may verify a predefined code such as a password. In this way, the NFC reader may easily and securely control access to its functions, for example by unlocking itself or enabling certain features only in response to an expected output of the authentication algorithm. For instance, the authentication data may comprise at least a part of a cryptographic key. In the shown example, the function attribute contains a fragment of an authentication key (i.e., a cryptographic key used for authentication purposes) for the ordered sequence identified by "SeqID_2". This may mean that the NFC reader should collect key fragments from a first, second and third NFC device, then collect the key fragment from the current (fourth) NFC device, and possibly collect further key fragments from other NFC devices. Finally, the NFC device may assemble the key fragments into a complete authentication key and execute the authentication algorithm.

In one or more embodiments, the sequence-specific data comprise a timing attribute which specifies a timing requirement associated with said function. In this way, the function may become time-dependent, which may be attractive for commercial purposes. For instance, in order to encourage a potential consumer to purchase a product quickly, a time-limited discount may be offered. In the shown example, the timing attribute has value "24 hours" for "SeqID_1", which indicates to the NFC reader that the current NFC device should be read within 24 hours after reading the previous NFC device. Thus, in this case, the timing attribute specifies the maximum amount of time that may elapse between reading the previous NFC device and the current NFC device. Likewise, the timing attribute has value "1 Jan. 2016" for "SeqID_2", which indicates to the NFC reader that the current NFC device should be read before Jan. 1, 2016. Thus, in this case, the timing attribute specifies that the current NFC device should be read before a predefined expiry time.

It is noted that, in the specific case where the function is an authentication algorithm, the authentication steps may also be performed in a time-dependent manner by using the aforementioned timing attribute. For example, explained above, the timing attribute has value "1 Jan. 2016" for "SeqID_2", which indicates to the NFC reader that the current NFC device should be read (i.e., that the authentication key fragment should be retrieved from said NFC device) before Jan. 1, 2016, Furthermore, the authentication steps may be performed in an order-dependent manner using the aforementioned sequence order attribute. For example, as explained above, the sequence order attribute has value "4" for "SeqID_2", which indicates that the NFC device occupies the fourth position in the ordered sequence identified by "SeqID_2". Thus, the authentication will fail if, for instance, one or more of the NFC devices occupying the first, second and third positions in said ordered sequence has not been read before the current NFC device is read.

In one or more embodiments, the NFC device is an NFC tag. An NFC tag is a relatively cheap and simple device which can easily be attached to all kinds of devices, ranging from home appliances to office equipment. The use of sequences of NFC tags thus facilitates the implementation of a wide range of functions in various environments. However, it is emphasized that the present disclosure is not limited to NFC tags. That is to say, the NFC device may also be implemented differently, for example as an emulated NFC card comprised in a portable device or as an NYC device acting in peer-to-peer mode.

Figure 3:
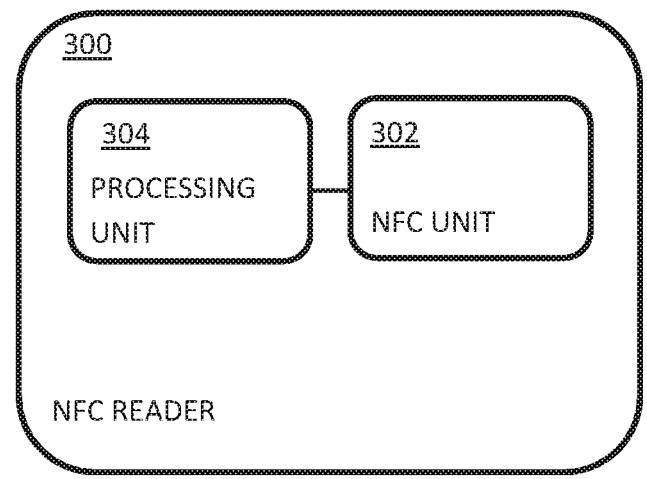
FIG. 3 shows an illustrative embodiment of an NFC reader.

FIG. 3 shows an illustrative embodiment of an NFC reader 300. The NFC reader 300 comprises an NFC unit 302 and a processing unit 304 which are operatively connected to each other. The NFC unit 302 is configured and adapted to read at least one sequence of devices. Furthermore, the processing unit 304 is configured and adapted to execute a function associated with said sequence only if all devices of said sequence have been read. This may be implemented as follows. For instance, the NFC reader 300 may read, through the NFC unit 302, at least one sequence attribute value from an NFC tag which is brought into proximity. The processing unit 304 may then, for example, compare this sequence ID attribute value with a list of known sequence identifiers stored in a memory (not shown) of the NFC reader 300 and, if it matches a known sequence identifier, check if all NFC tags of the particular sequence have already been read. For instance, the memory may contain a table in which, for each known sequence identifier, a set of NFC tag identifiers (Unique Identification Numbers, UIDs) is kept. Typically, the NFC reader 300 will also read the UID of NFC tags, so the processing unit 302 may flag which NFC tags of the particular sequence have already been read, such that said checking is facilitated. It is noted that the list of known sequence identifiers need not necessarily be stored within the memory of the NFC reader 300; it can for instance also be a part of a back-end system which is linked to the NFC reader 300. Alternatively, the information on the complete sequence may be kept in each NFC tag belonging to said sequence. The NFC reader 300 may then simply keep, when it starts reading tags of a particular sequence, a history of UIDs retrieved from tags of said sequence, and pass on this history to a next tag of said sequence. This tag may then check if it is the last tag of the sequence, and if so, transmit a sequence-completion signal to the NFC reader 300. In response to this sequence-completion signal, the NFC reader 300 may execute the function. The skilled person will appreciate that there are other ways to check whether all NFC devices of a given sequence have been read. Furthermore, the skilled person will appreciate that the phrase "reading the NFC device" may in the present context be interpreted broadly. For example, it may suffice that the NFC reader 300 is able to identify an NFC device in its proximity and retrieve only the sequence-specific data relevant for executing a particular function from it. Thus, reading the NFC device does not mean that the whole contents of the NFC device's memory must or can be read. It is conceivable, for example, that an error condition occurs when the NFC reader 300 attempts to read some parts of the NFC device's memory, while it is still possible to retrieve the relevant sequence-specific data. In that case, the condition that the NFC device is read is also deemed to be fulfilled.

In one or more embodiments, the processing unit 304 is configured and adapted to execute the function only if the devices of the sequence have been read in a predefined order. The use of ordered sequences may increase the threshold for unlocking some functions, for example. In order to further increase this threshold, the function may be made time-dependent in the manner described above. More specifically, the processing unit 304 may be configured and adapted to execute said function only if the time elapsed between reading particular ones of the devices of a sequence does not exceed a predefined threshold. Alternatively or in addition, the processing unit 304 may be configured and adapted to execute said function only if at least one of said devices has been read before a predefined expiry time. The processing unit 304 may use timing attribute values read from the devices in order to determine which timing requirements apply to particular devices of the sequence.

Figure 4:
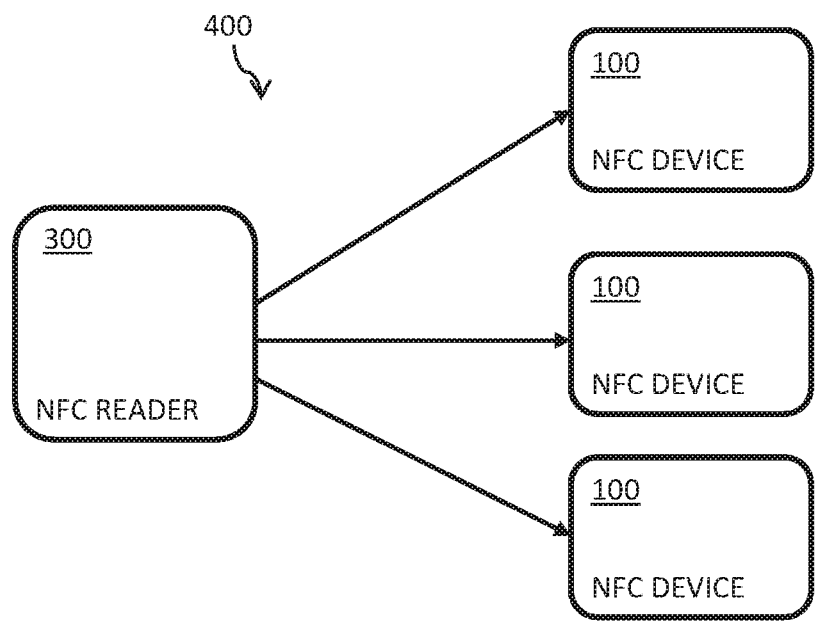
FIG. 4 shows an illustrative embodiment of an NFC system.

FIG. 4 shows an illustrative embodiment of an NFC system 400. The NFC system 400 comprises an NFC reader 300 of the kind set forth and a plurality of NFC devices 100 of the kind set forth. In this example, the NFC devices 100 form part of an unordered sequence. Thus, the NFC reader 300 will execute a function associated with said sequence provided that all NFC devices 100 of the sequence have been read, regardless of the order in which the NFC devices 100 have been read.

Figure 5:
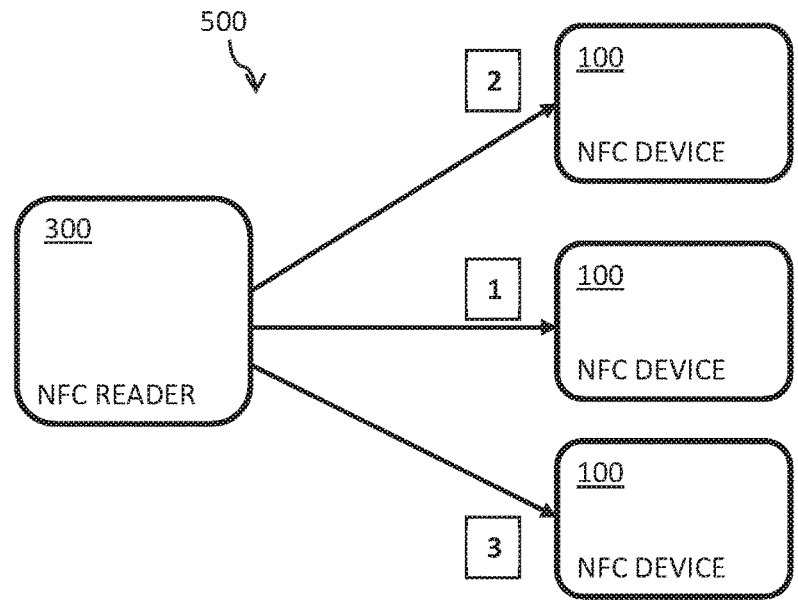
FIG. 5 shows another illustrative embodiment of an NFC system.

FIG. 5 shows another illustrative embodiment of an NFC system 500. The NFC system 500 comprises an NFC reader 300 of the kind set forth and a plurality of NFC devices 100 of the kind set forth. In this example, the NFC devices 100 form part of an ordered sequence. Thus, the NFC reader 300 will execute a function associated with said sequence provided that all NFC devices 100 of the sequence have been read in a specific, predefined order. In the shown example, the middle NFC device 100 should be read first, then the upper NFC device 100 should be read, then the lower NFC device 100 should be read. The storage unit of each NFC device 100 may store a sequence order attribute which enables that the NFC reader 300 quickly checks if the NFC devices 100 are read in the correct order. Alternatively, the order information may be kept in the memory of the NFC reader 300, for example in a table which contains, for each sequence identified by a sequence identifier, at least two tuples of the form <<tag UID, position>>. It is noted that the order information need not necessarily be kept in the NFC reader 300; it can for instance also be kept in a back-end database which is linked to the NFC reader 300.

Figure 6:
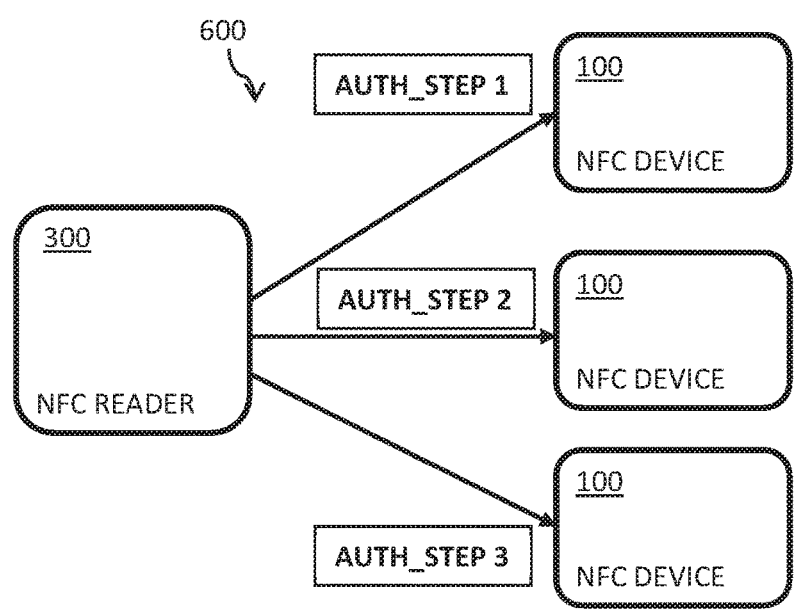
FIG. 6 shows a further illustrative embodiment of an NFC system.

FIG. 6 shows a further illustrative embodiment of an NFC system 600. The NFC system 500 comprises an NFC reader 300 of the kind set forth and a plurality of NFC devices 100 of the kind set forth. In this example, the NFC devices 100 are read in sequence as part of a user authentication procedure, for example in order to enable user access to the NFC reader 300. The NFC reader 300 may for example collect authentication key fragments from the NFC devices 100 in three subsequent authentications steps, assemble the key fragments into a complete authentication key and execute an authentication algorithm that takes the assembled authentication key as input. The NFC reader 300 may enable user access to itself in dependence on an output of the authentication algorithm. This provides a convenient yet effective way to unlock the NFC reader 300. It is noted that the authentication algorithm may be regarded as a particular instance of a function of the kind set forth. Thus, the NFC reader 300 may perform a sequence-specific authentication function by means of which it unlocks itself in response to a correct authentication input.

The devices, methods and systems described herein may be used to advantage in various environments and contexts. For example, a product manufacturer could manufacture a number of goods equipped with NFC tags, and each of them when bought in a set can form a sequence, and thus buying such a sequence can entail you for certain benefits, such as discounts and loyalty points. Similar benefits could be offered by in shopping malls or by retail outlets. When a user buys a particular set of DVD/CD's, for example, each having NFC tags that form part of a sequence, the user may be able to unlock a bonus feature by tapping each NFC tag to an NFC reader embedded in a DVD/CD player. Other applications may be envisaged as well: for instance, tapping an air-conditioner remote control after tapping a health monitor device could automatically tune an air-conditioning device. Furthermore, using a sequenced authentication mechanism based on NFC devices, a home-security or office-security system can be improved and customized. More specifically, the threshold for accessing certain areas can be increased by requiring tapping a sequence of tags instead of stand-alone or individual tags. This threshold may be further increased by requiring tapping said tags in a predefined order. Applications in tourism and gaming are conceivable as well.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "storage unit" or "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC device
102 storage unit
200 content of storage unit
300 NFC reader
302 NFC unit
304 processing unit
400 NFC system
500 NFC system
600 NFC system

The invention claimed is:

1. A near field communication device for enabling execution of a function performed by an external near field communication reader device, the near field communication device comprising a storage circuit configured and arranged to:
   store sequence-specific data that identifies at least one sequence of a plurality of devices of which said near field communication device forms part; and
   provide access to the sequence-specific data to the external near field communication reader device, thereby enabling the execution of the function.

2. A near field communication device as claimed in claim 1, wherein the sequence-specific data comprise a sequence identifier attribute which identifies the devices in the sequence of the plurality of devices, wherein the sequence-specific data from all of the plurality of devices of the sequence enables the execution of the function of the external near field communication reader device.

3. A near field communication device as claimed in claim 1, wherein the sequence of the plurality of devices is an ordered sequence, and wherein the sequence-specific data comprise a sequence order attribute which specifies a position of the near field communication device in said ordered sequence of the devices, wherein the sequence-specific data from the sequence of the plurality of devices enables execution of the function of the external near field communication reader device responsive to the sequence-specific data being collected in a specified order.

4. A near field communication device as claimed in claim 1, wherein the sequence-specific data comprises a function attribute which enables, at least in part, the external near field communication reader device to execute the function which is associated with the sequence of the plurality of devices, wherein the function associated with the sequence of the plurality of devices is executable responsive to function attributes collected from each of the devices in the sequence.

5. A near field communication device as claimed in claim 4, wherein the function attribute comprises authentication data which enable said near field communication reader to perform an authentication algorithm that takes said authentication data as an input.

6. A near field communication device as claimed in claim 5, wherein the authentication data comprise at least a part of a cryptographic key.

7. A near field communication device as claimed in claim 1, wherein the sequence-specific data from the sequence of the plurality of devices enables execution of the function of the external near field communication reader device and comprises a timing attribute which specifies a timing requirement associated with said function.

8. A near field communication device as claimed in claim 1, being a near field communication tag.

9. A near field communication device as claimed in claim 1, wherein the sequence-specific data comprises a sequence identifier attribute which identifies a sequence order of the devices in the sequence.

10. A near field communication device as claimed in claim 1, wherein the storage circuit is configured and arranged to provide the sequence-specific data responsive to tapping of the near field communication device to the near field communication reader device.

11. A method for configuring a near field communication device, comprising:
   storing, in a storage circuit of said near field communication device, sequence-specific data that identifies least one sequence of devices of which said near field communication device forms part; and
   providing access to the sequence-specific data to an external near field communication reader device.

12. A non-transitory computer program product comprising instructions which, when executing by a processing circuit, cause said processing circuit to carry out a method as claimed in claim 11.

13. A near field communication reader comprising:
   a near field communication circuit configured and arranged to read data from storage circuits of devices in a sequence of devices; and
   a processing circuit configured and arranged to execute a function associated with said sequence by determining if all devices of said sequence have been read and executing the function in response to determining the data from all devices in the sequence of devices have been read.

14. A near field communication reader as claimed in claim 13, wherein the processing circuit is configured and arranged to execute said function in response to determining the devices of said sequence have been read in a predefined order.

15. A near field communication reader as claimed in claim 13, wherein the processing circuit is configured and arranged to execute said function only if a time elapsed between reading particular ones of said devices does not exceed a predefined threshold and/or only if at least one of said devices has been read before a predefined expiry time.

16. A near field communication reader as claimed in claim 13, wherein the function is an authentication algorithm that takes authentication data retrieved from said devices as input, and wherein the processing circuit is configured and arranged to enable user access to the near field communication reader in dependence on an output of said authentication algorithm.

17. A method for facilitating execution of functions, comprising:
   reading, by a near field communication circuit comprised in a near field communication reader device, sequence-specific data from a sequence of devices; and
   executing, by a processing circuit comprised in said near field communication reader device, a function associated with said sequence in response to determining all devices of said sequence have been read.

* * * * *